April 23, 1935. P. A. KINZIE 1,998,458
VALVE
Filed Dec. 28, 1932 3 Sheets-Sheet 1

Inventor:
Phillip A. Kinzie,
By Byrnes, Townsend & Potter,
Attorneys.

April 23, 1935.   P. A. KINZIE   1,998,458
VALVE
Filed Dec. 28, 1932   3 Sheets-Sheet 2

Inventor:
Phillip A. Kinzie,
By Bysacks, Townsend & Potter,
Attorneys.

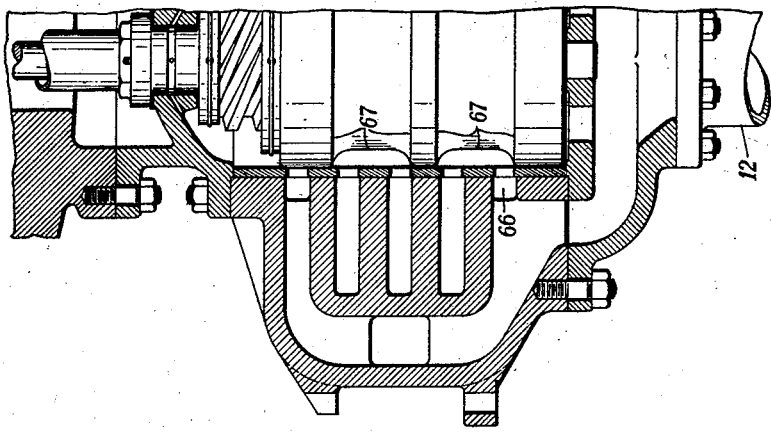
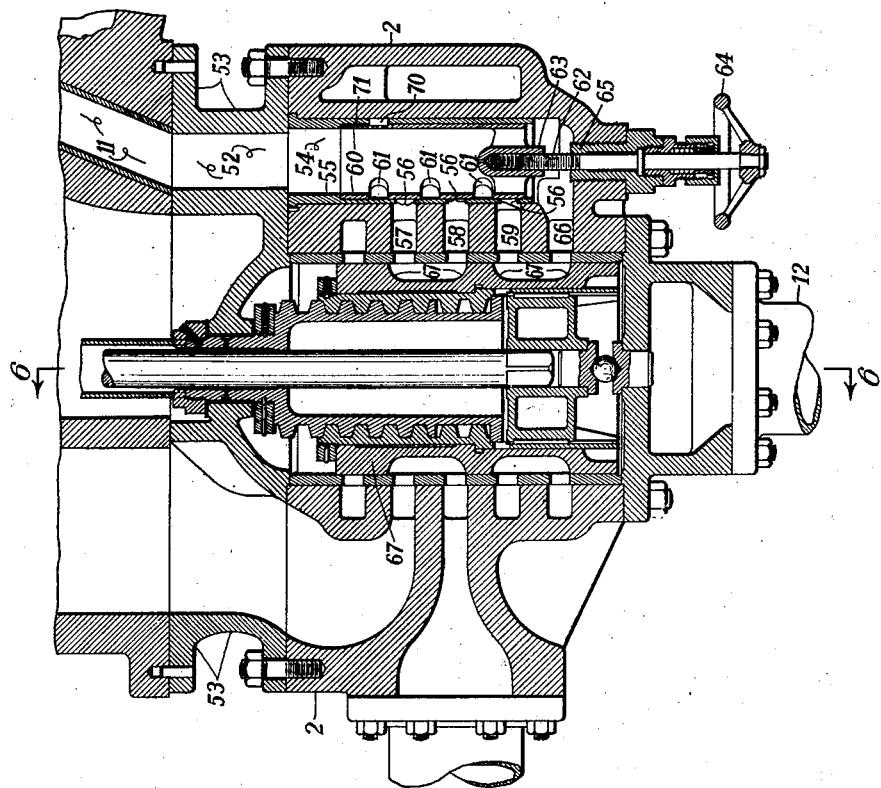

Patented Apr. 23, 1935

1,998,458

UNITED STATES PATENT OFFICE 1,998,458

VALVE

Phillip A. Kinzie, Denver, Colo., assignor to Universal Hydraulic Corporation, Denver, Colo., a corporation of Colorado Application December 28, 1932, Serial No. 649,222

22 Claims. (Cl. 137—139)

This invention relates to a valve including an automatic air vent and drainage system for use with hydraulically operated apparatus, such as valves of the needle type.

The invention will be described as embodied in a hydraulically operated needle valve similar to that described and claimed in United States Patent No. 1,980,067, issued to me on November 6, 1934, but it is to be understood that the invention is applicable to other systems in which it is desirable to release air from cavities and pressure chambers into which fluids under pressure are introduced and to admit air to such cavities and chambers whenever the pressure fluid is withdrawn therefrom, thereby to insure that such withdrawal or drainage will be complete. The pressure fluid is of substantially greater density than the air, being usually water, and the differential action upon the control valves of air and of the pressure fluid is due to the difference in the magnitudes of the pressures or reactions which result when fluids of different densities flow through the control valves.

When valves such as those illustrated herein are being placed in service, either when first installed, after being drained for inspection or maintenance work, or after a period of idleness, it is essential that all the pressure chambers be freed from trapped air and completely filled with fluid, likewise all passageways and cavities where fluid under pressure will be confined. This is necessary, due to the fact that the large size of such valves, together with the high fluid pressure under which they operate and the large internal areas subjected to such pressure, will, with any appreciable quantities of air trapped within such spaces, provide conditions favorable to the production of resilient and explosive forces of high magnitude tending to make operation uncertain and dangerous and, in some cases, destructive.

Complete drainage of valves such as those herein illustrated is of nearly equal importance as a protection against freezing with its attendant danger of rupture of the castings, and to avoid the continued concentrated oxidation and corrosion of the interior working surfaces which usually occur when such mechanisms are left for long periods with their interior only partially drained.

An object of the invention is to provide in combination with a valve of the type herein illustrated an air venting and air supply system which will automatically vent air from pressure chambers and cavities when pressure fluid is supplied thereto, and which will automatically pass air to such chambers and cavities when the pressure fluid is to be drained therefrom. An object is to provide, in a hydraulically operated system including a plurality of pressure chambers, an improved and simplified drainage construction for simultaneously draining a number of the pressure chambers. A further object is to provide a needle valve having a plurality of pressure chambers for receiving a pressure fluid to actuate the valve, and air vent and inlet valves for automatically venting or supplying air to said chambers as changing conditions may require. A further object is to provide a needle valve including simple apparatus for draining pressure fluid from a plurality of pressure chambers and pressure fluid passages when the valve is to be taken out of service. More particularly, an object is to provide, in a needle valve of the multiple chamber type, automatic apparatus for venting or supplying air to the pressure chambers as conditions may require, and a simple and economical drainage system which may be manually adjusted to effect drainage of pressure fluid from all chambers and passages, whatever the position of the needle may be.

These and other objects and advantages of the invention will be apparent from the following specification when taken with the accompanying drawings in which:

Fig. 5 is a fragmentary and enlarged vertical longitudinal section through the paradox control mechanism and the associated drain valve of the needle valve shown in Fig. 1; and Fig. 6 is a vertical transverse half section taken substantially upon the line 6—6 of Fig. 5.

Figures 1, 1A:
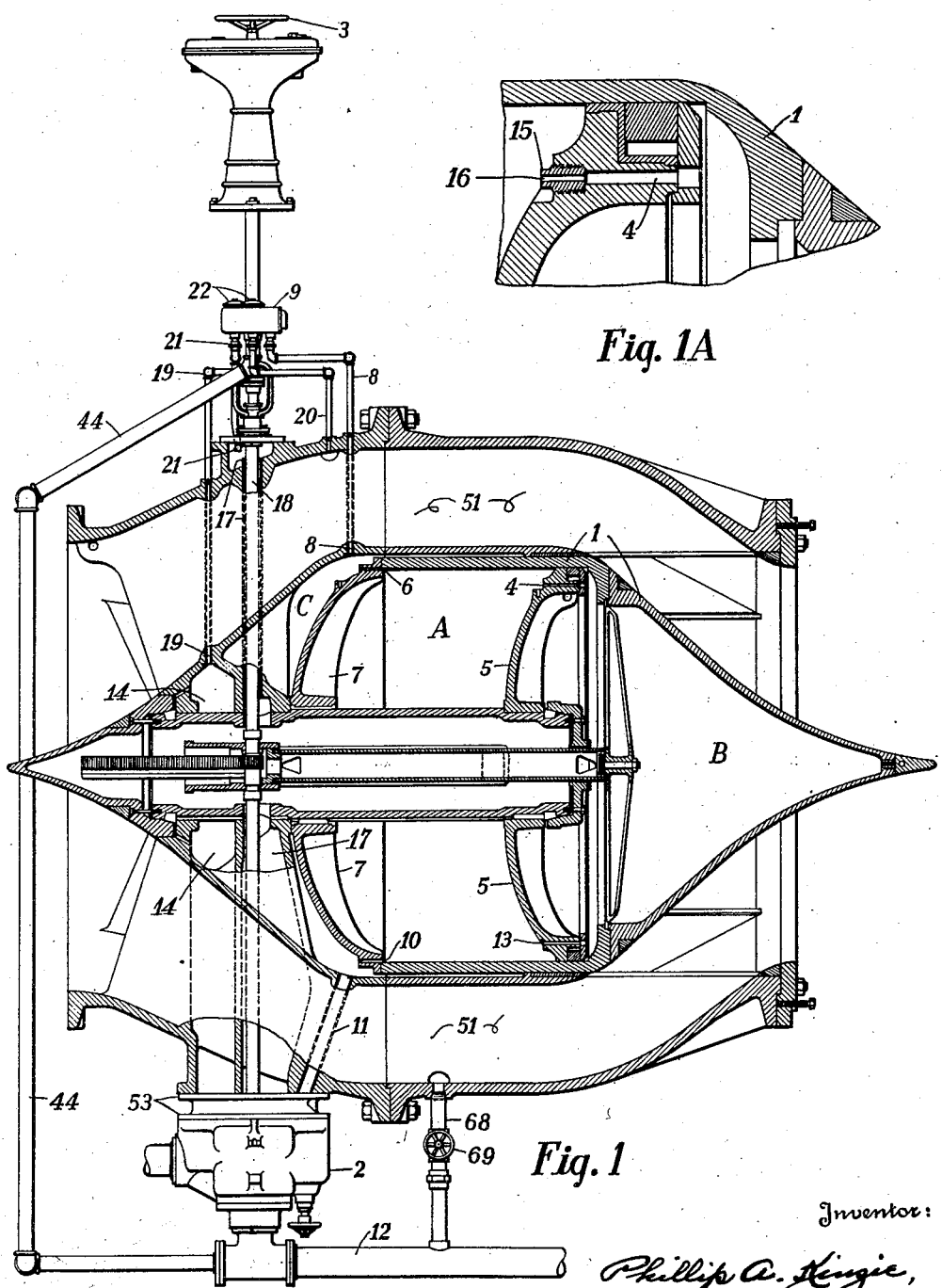
Fig. 1 is a vertical longitudinal section through a needle valve embodying the invention.
Fig. 1A is an enlarged detail section showing the construction of the air vent and drain orifices illustrated in Fig. 1.

The hydraulically operated apparatus in which the invention is incorporated comprises a needle valve such as described and claimed in United States Patent No. 1,980,067, issued to me on November 6, 1934, and reference may be had thereto for a detailed description of the general construction and operation of the needle valve and the paradox control associated therewith.

For an understanding of the present invention, it is sufficient to state that the needle valve includes the needle 1 whose position in the valve casing is determined by the relative pressures established within pressure chambers A and B of the needle by pressure fluid which is supplied to and exhausted from the chambers through a paradox control 2 which is manually adjusted by a handwheel 3.

In accordance with the invention, a small continuously open air vent 4 is provided at the upper portion of the fixed diaphragm 5 which constitutes the dividing wall between chambers A and B, and a similar open vent 6 is provided in the needle head which separates the chamber A from the cavity C which is continuously vented to atmosphere through a breather pipe 8 which extends upwardly to a combined air vent-breather manifold 9. A small, continuously open drain 10 is provided at the low point of needle head 7 through which pressure fluid escapes from chamber A into a waste pipe 11 which continuously drains the cavity C, through a drainage system to be described later, to the waste pipe 12 into which exhaust pressure fluid is discharged by the paradox control 2. A similar small drainage opening 13 in diaphragm 5 provides a restricted, but free, communication between the low points of chambers A and B.

As a sealing ring or packing is preferably arranged at the periphery of diaphragm 5 to prevent leakage between chambers A and B, it might, at first sight, appear that the described free communication between the chambers, and between chamber A and the cavity C, would seriously interfere with the proper functioning of the pressure chambers, thereby resulting in an erratic control of the needle. This is not the case, however, since the vent and drain openings are so small, in comparison with the pressure fluid passages, as to have no appreciable effect upon the operation of the valve. As shown in Fig. 1A, the vent 4 and each of the other vent and drain openings 6, 10 and 13, is preferably first drilled through its respective division wall as an oversized opening, and is threaded to receive interchangeable bushings or plugs 15 which have accurately calibrated openings 16 therethrough. The approximate size of the opening 16 for a given vent or drain passage can be determined in advance and, after testing by actual operation, other plugs 15 with calibrated openings of either smaller or larger size may be substituted if any change is found necessary or desirable. The plugs 15 are preferably made of noncorrodible material to insure that the apertures 16 will not vary through corrosive action.

The space 14 which forms part of the fluid passage connecting the chamber A to the paradox control, the fluid conduit through the main valve casing, and the space 17 through which the control shaft extends to the paradox control and which forms a part of the fluid passage between chamber B and the paradox control, are provided with individual air vent pipes 19, 20, 21, respectively, which are connected to threaded bosses on the valve casing and extend to the air vent manifold 9 where they are controlled by individual air valves 22 of the type described and claimed in my divisional application for United States Letters Patent Serial No. 738,204, filed August 3, 1934. The several air vent valves are of identical construction, and the valve associated with vent pipe 21 is shown in section in Fig. 2. In each vent valve, a tube 23 is threaded adjacent its lower end and provided with a shoulder 24 which seats against a similarly threaded boss 25 of the manifold 9 when the tube is introduced from the top of the manifold. The meeting faces of the boss and shoulder are machined to support the tubes in fixed position vertically of the manifold body.

Above the shoulder 24 each tube is taperingly extended with a constantly decreasing outer diameter until, near its upper end, this tapering reduction merges into an outwardly curving fillet 26 which gives the top of the tube a diameter somewhat greater than that of the shoulder 24.

Figures 3, 4:
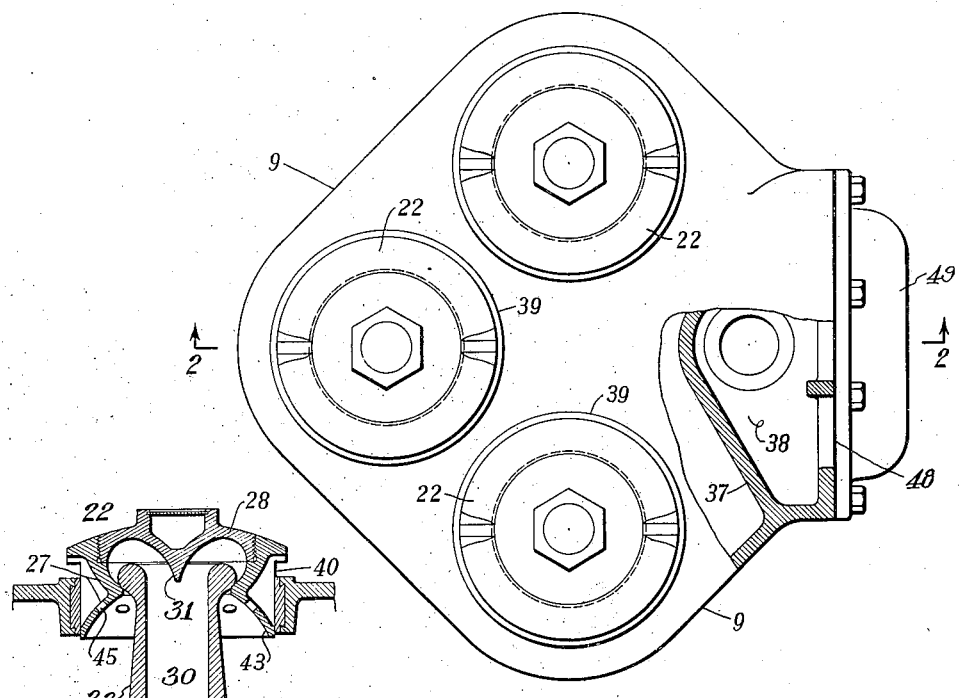
Fig. 3 is a section on line 3—3 of Fig. 2, but with the automatic air valve in the closed position.
Fig. 4 is a plan view of apparatus shown in Fig. 2.

The curving filleted lip 26 forming the upper limits of the tube 23 is so shaped that the cooperatingly surrounding surfaces of the vertically reciprocating valve 22, consisting of the plunger 27 and the cap 28, provide an outwardly expanding annular fluid passage 29 from the central passage 30 of the tube 23. This annular passage causes fluid entering at the conical point 31 concentric with the axis of the tube 23 to expand radially outwards away therefrom and to simultaneously and progressively change its direction of flow from a course coincident with the axis of the tube 23 until such course of flow has finally been turned upon itself approximately 200 degrees. The expanding annular fluid passage 29 so provided allows air to pass from tube 23 under high velocity without causing closure of the valve, but as soon as fluid under any considerable velocity impinges upon the curving surfaces of the movable element, the energy of its moving mass reacts upon those surfaces to produce vertical upward motion in substantially the same manner that water passing through the wickets of a Francis type turbine and thence through the vanes or blades of the runner produces rotary motion in that instance, although the direction of flow in this illustration is in a reverse direction from that employed in this present invention. When pressure liquid strikes the valve 22, it immediately closes and the relative position of its parts is then as shown in Fig. 3, and, so long as liquid pressure is present within the tube 23 the valve will remain in the closed position. When the pressure within the valves recedes to nearly that of the atmosphere, the weight of the moving valve element 22 causes it to drop back to the position shown in Fig. 2 and so opens the valve and allows air to enter therethrough.

As before stated, the moving valve element 22 consists of the plunger 27 and the cap 28 which are matingly threaded to each other to form that element. By this arrangement and construction, the interior, curving impulse surfaces of both these parts can be smoothly machined, the base of tube 23 passed through the throat seat 32 in the plunger 27, a spanner wrench applied to one of the two holes 33 in the rim of the plunger 27, and the cap 28 then screwed to place with an ordinary wrench, thus completing the valve assembly, which is then inserted into the non-corrodible metal liner 34 in the top surface of manifold casting 9, and the lower threaded portion of tube 23 is then entered and screwed into the tapped hole in the boss 25 formed on the bottom surface of the manifold casting 9, the lower extremity of tube 23 being provided with a hexagonal end 36 to which a wrench is applied for drawing it into tight engagement with the thread of the boss 25.

Figure 2:
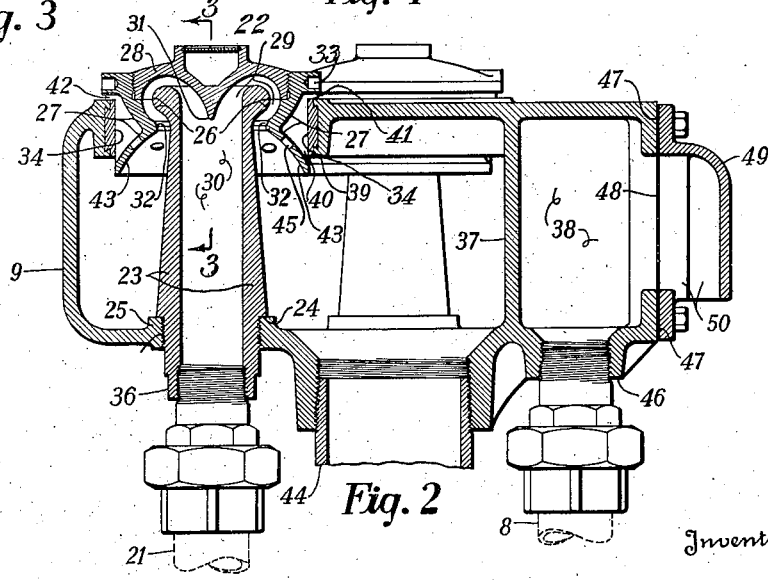
Fig. 2 is a vertical longitudinal section through the air vent-breather manifold assembly, with the vent valves in the open position as taken on line 2—2 of Fig. 4.

The manifold body 9 consists of a hollow structure containing the three automatic air valves, with a vertical partition 37, Figs. 2 and 4, integral with it, segregating these valves from the breather cavity 38. Cylindrically bored bosses 39 are provided in the top surface of this casting to receive the liners 34 of the three air valves, and each of these bosses is machined upon its upper face. Into the bores of these bosses the plungers 27 are reciprocatingly received and are guided by the radial ribs 40 turned to make a loose sliding fit therein.

The upper portions of these ribs are each provided with a finished shoulder 41 which rests upon the top finished face of the bosses 39 when the valves are open and thereby positions the plungers 27 so that an annular space 42 is provided between the underside of the rims of these plungers and the opposing upper faces of the bosses through which the air coming from the vent pipes below escapes.

The plungers 27 are provided with expanding dome shaped skirts 43 at their lower extremities which prevent any fluid from escaping through the annular spaces around the plungers above, such fluid being deflected downwards by these skirts into the interior of the manifold casting 9 where it collects and is carried away to any appropriate point of disposal below by the drain pipe 44 which serves all three of the air valves. These domed shape skirts provide expanding annular fluid ways, concentrically disposed with respect to the impulse tubes 23, within which any fluid entering from above under relatively high velocity forms vertical vortices which quickly reduce its velocity to a low value as it enters the lower central cavity of manifold casting 9 and is carried away by drain pipe 44 below. Openings 45 are provided through the skirts to allow air to escape therethrough, and these openings are so positioned in the skirts that while they freely pass air, liquid under high velocity passing along the inner concave surfaces of the skirts 43 will, due to the inertia of its greater mass, pass across these holes without escaping therethrough. These openings 45 are equally spaced circumferentially around the skirts in sufficient numbers so that their combined areas in each plunger 27 are greater than that of the passage 30 in tube 23, thereby providing ample escape area for the air passing through each valve.

With the general arrangement and relative shape and cooperation of parts as herein illustrated, these valves have been found by actual tests to pass relatively large quantities of air under high velocities, and to close quickly with little if any impact as soon as fluid flow reaches them, and to avoid spilling of fluid outside of the manifold body. By making the guide ribs 40 on the plungers 27 narrow and loosely fitted in the bores of the bosses 39 in the top of the manifold casting 9 and by making the female valve seat 32 as a hollow conical surface contacting the mating rounded fillet surface 26 of the male seat, forming in effect a ball and socket joint, yet making only line contact at the seats, practically perfect freedom of the moving element to adjust itself to the fixed element is afforded, thus insuring a tight seat at low pressures, and at the same time permitting movement to seat or unseat with a minimum of friction so that the weight of the moving valve element 22, consisting of the parts 27, 28 is always more than ample to insure opening of the valve as soon as the pressure upon its interior is released.

By inspection of Fig. 2 it will be seen that the breather pipe 8 which communicates with cavity C, Fig. 1, in the valve below, is threaded into a boss 46 on the under side of manifold body 9, and communicates with a cavity 38 therein which is segregated from that containing the air valves by the partition 37. This cavity opens through the vertical flange face 47, which is covered by a fine mesh screen 48 against which the matingly flanged hood 49 or guard with its downward facing opening 50 is bolted, thereby holding the screen 48 securely in place.

This arrangement affords complete protection to the breather outlet 8 and provides a large screen area through which air being drawn into or expelled from cavity C passes, thereby effectually preventing any injurious matter from gaining access thereto.

The large drain pipe 44 from the manifold body 9 has been shown extending downwards and connecting into the drain line 12 below the paradox control 2. It is not essential that this be done however, for the quantity of liquid discharged from the automatic air valves in closing is small and occurs at infrequent intervals. The waste line 44 could discharge into a gutter or even onto the operating floor without excessive annoyance.

As has already been explained, cavity C receives the drainage from chambers A and B within the needle, and this drainage is carried away from the bottom of cavity C by the inclined passageway 11 contained within the bottom radial rib 51 of the needle valve. The bottom end of this passageway 11 registers with a mating vertical passage 52, Fig. 5, formed in the base casting 53 of the paradox control 2, and this passage 52 in turn is in axial alignment with the cylindrical vertical passage 54 formed in the control body 2. This passage is bushed with a non-corrodible metal liner 55 pressed tightly into the control body 2 and provided with slotted port apertures 56 on the side adjacent to and registering with the three middle cored ports 57, 58, and 59, in the paradox control 2. Bushing 55 is counterbored from its bottom end towards the top for about three fourths of its vertical length, said counterbore terminating in a shouldered face at its upper extremity which serves as a stop to limit the upward travel of a close fitting tubular member 60 which is reciprocatingly mounted within the counterbore.

The tubular member 60 is likewise made from non-corrodible metal and is provided with three slotted port apertures 61 upon its left hand side which register with those in the bushing 55 when the member 60 is drawn downwards to the lower limit of its travel by the screw 62 which threadedly engages the spider hub 63 which is formed integral with tubular member 60. When this member 60 is raised to its uppermost position, as shown in Fig. 5, its ports are shut off from communication with those through the bushing 55, while its interior provides an uninterrupted passage for continuous drainage of cavity C in the valve above, and, when member 60 is in this position, the paradox control will function for the operation of the valve. When, through the agency of the handwheel 64 and screw stem 62, the tube 60 is drawn downwards to its lowest limit of travel defined by the lower face of hub 63 coming into contact with the opposing upper face of stem guide 65, the ports 61 in tubular member 60 register with those in the bushing 55 and any fluid contained within the paradox control or in the cavities and port passages with which it is in communication within the valve above, other than cavity C will drain out through these ports, through exhaust port 66, Figs. 5 and 6, and from thence into the drain line 12 below the control 2, while cavity C likewise drains through the center of tubular member 60 and through the ports below as before described. Tubular member 60 is prevented from rotating in bushing 55 by the key 70, embedded in bushing 55, which engages a corresponding keyway 71 cut in the upper portion of the tube 60.

By the arrangement described, the entire interior of the needle valve, other than that below the control piston 67 and at the bottom of the water passage through the main valve casing, is drained by opening the tubular valve 60, and this action takes place regardless of the position of the needle 1. Only one other pipe connection 68 to the water passage, with a stop valve 69 therein, is required as an independent drain beneath the needle valve.

It will be obvious to those skilled in the art to which the invention relates that modifications may be made in the details of the parts and their relative arrangement and construction without departing from the spirit of my invention or the scope of the following claims.

I claim:

1. In a needle valve, a casing, a needle slidable within said casing, means cooperating with said needle to form a pair of pressure fluid chambers, a cavity within said casing, a breather providing a continuous vent of said cavity to atmosphere, a passage for continuously draining said cavity, and continuously open vents in said chamber-defining means for venting air from said chambers into said cavity.

2. In a needle valve, a casing, a needle slidable within said casing, means cooperating with said needle to form a pair of pressure fluid chambers, a cavity within said casing, a breather providing a continuous vent of said cavity to atmosphere, a passage for continuously draining said cavity, and continuously open drain openings in said chamber-defining means for discharging pressure fluid from said chambers into said cavity.

3. A needle valve as claimed in claim 2, in combination with continuously open vents in said chamber-defining means for venting air from said chambers into said cavity.

4. A needle valve comprising a casing, a cylinder within said casing, a needle within said cylinder and having a head, a diaphragm within said needle and cooperating therewith and with said head to define a pair of pressure chambers, a cavity within said cylinder and defined in part by said needle head, continuously open vents through said needle head and diaphragm at the top thereof, and continuously open drain openings through said needle head and said diaphragm at the bottoms thereof.

5. In a valve, a casing, a cylinder and a valve member telescoping within the same, means cooperating with said cylinder and valve member to form a cavity within said cylinder and a pair of tandem pressure chambers within said valve member, means comprising a plug having a calibrated opening therethrough for placing the upper parts of said chambers in permanent communication, and means comprising a plug having a calibrated opening therethrough to place the cavity in permanent communication with the pressure chamber adjacent the same.

6. A valve as set forth in claim 5, in combination with a breather pipe affording constant communication between said cavity and the atmosphere.

7. A valve as set forth in claim 5, in combination with an open drain passage for said cavity and means comprising plugs having calibrated openings therethrough for maintaining free communication between the lower portion of said tandem pressure chambers and said cavity.

8. In apparatus of the class described, the combination with a casing, a member movable in said casing, means cooperating with said member to define a chamber for receiving pressure fluid heavier than air to actuate said member, of an air vent pipe having an inlet at the upper part of said chamber, said pipe extending upwardly from its inlet end, and valve means at the outlet end of said vent pipe normally biased to permit flow of air therethrough in either direction, said valve means closing automatically when subjected to the pressure of said pressure fluid tending to escape from said chamber.

9. The invention as set forth in claim 8, wherein said valve means comprises a tubular member having an enlarged head, and a cap valve surrounding said head and extending rearwardly to a restricted portion adapted to seat upon the rear of said head, whereby the passage from the end of said head is of annular form extending rearwardly of said head.

10. The invention as set forth in claim 8, wherein said valve means comprises a tubular member having an enlarged head, a cap valve surrounding said head and extending rearwardly to a restricted portion adapted to seat upon the rear of said head, said cap valve having a skirt flaring outwardly and rearwardly from said restricted portion, and air ports extending through said skirt.

11. The invention as set forth in claim 8, wherein said valve means comprises a tubular member having an enlarged head, a cap valve surrounding said enlarged head and having a restricted portion adapted to seat against the rear of said enlarged head, and means biasing said cap valve to move axially of said tubular member to leave an outlet opening between the restricted portion of said cap valve and the rear of the enlarged head, said biasing means resisting closing movement of said valve when said cap valve is subjected to the reaction of an air stream through said tubular member but permitting closing movement by the reaction of pressure fluid tending to escape through said tubular member.

12. The invention as set forth in claim 8, wherein said valve means comprises a vertically arranged tubular member having an enlarged head, and a cap valve surrounding said head and having a lower portion of less diameter than said enlarged head, and means normally positioning said cap valve to leave an annular downwardly-opening passage between the interior of said cap valve and said enlarged head, the reaction of a pressure fluid tending to escape through said annular passage lifting said cap valve to seat the restricted portion thereof against said enlarged head.

13. In a needle valve, the combination with a casing having a fluid conduit therethrough, a needle slidable within said casing, means cooperating with said needle to define a plurality of chambers for receiving pressure fluid to actuate said valve, and passages within said casing for supplying pressure fluid to and exhausting the same from said chambers; of means comprising an automatic vent valve for automatically venting air from at least one of the spaces comprising said chambers, passages and fluid conduit; said valve comprising a stationary member and a movable member cooperating therewith to define a reversely bent fluid flow passage when the valve is open, said members having cooperating surfaces engageable to close said valves when the movable member is displaced by the pressure thereon of pressure fluid tending to flow through said fluid flow passage.

14. A valve as claimed in claim 13, wherein said vent valve is connected to one of said spaces other than said chambers, and venting means includes a cavity within said casing, means for transferring air between said chambers and said cavity when the pressures therein are approximately the same, and a permanently open breather maintaining the pressure within said cavity substantially at atmospheric.

15. A valve as claimed in claim 13, wherein a separate vent valve is provided for each of said spaces other than the said chambers, and all of said vent valves are mounted in a common manifold, in combination with a fluid waste pipe for draining fluid from said manifold.

16. In a needle valve, a casing having a fluid conduit therethrough, a needle slidable within said casing, and means defining chambers for actuating said needle and passages for supplying pressure fluid to and exhausting the same from said chambers; of means for automatically venting air from the spaces comprising said fluid conduit, chambers and passages; said venting means comprising pipes extending above said casing and having their lower inlet ends communicating with the respective spaces, a manifold having a partition dividing the same into two compartments which are both open to atmosphere, the pipe which vents said chambers extending directly into one of said compartments, and air vent valves in the other compartment and controlling the flow through the remaining pipes, said air vent valves discharging pressure fluid escaping therefrom into said manifold.

17. A valve as claimed in claim 16, wherein said air vent valve opens automatically when the pressures within said spaces are not substantially in excess of atmospheric, in combination with a single means for draining pressure fluid from a plurality of the said spaces.

18. In a needle valve, a casing having a fluid conduit therethrough, a needle slidable within said casing to control the flow through said fluid conduit, means defining a plurality of spaces for passing pressure fluid to and exhausting the same from said needle to operate the same, a drain passage, a tubular member slidable within said drain passage and having ports therethrough, and ports in the wall of said drain passage communicating with the respective spaces, whereby said spaces may be drained into said drain passage by adjusting said tubular member to bring the ports thereof into registry with the ports of said drain passage wall.

19. A needle valve comprising a casing having a fluid conduit therethrough, a cylinder within said casing, a needle slidable in said cylinder, means cooperating with said needle and cylinder to define a pair of tandem pressure chambers within said needle and a cavity in said cylinder, pressure fluid passages communicating with said chambers and having lower portions located below said chambers, a drainage passage, ports extending between the drainage passage and each of said pressure fluid passages, and a ported slide valve controlling said ports.

20. A valve as claimed in claim 19, wherein said drain passage has an inlet at the bottom of said cavity to provide a continuously open drain therefor.

21. A valve as claimed in claim 19, in combination with a control valve for regulating the flow of pressure fluid through the respective pressure fluid passages, the said lower portions of said passages and a portion of said drainage passage being within the casing of said control valve, and the said ports and slide valve being within said control valve casing.

22. In a needle valve, the combination with a valve of the type including a main casing having therein a cavity vented to atmosphere and a pair of pressure chambers within a movable needle, of a control valve casing below said main casing, passages in said control valve casing communicating with said chambers, a pressure fluid inlet for said control valve casing, an exhaust fluid outlet for said casing, a drain passage in said control valve casing and open to said exhaust fluid outlet, an interior wall of said control valve casing having ports therethrough for draining each of said first passages into said drainage passage, and a ported liner slidable in said drainage passage for controlling said ports.

PHILLIP A. KINZIE.